R. A. KLEIN, W. H. BURTIS, AND L. U. EYERLY.
ELEVATING MECHANISM FOR AUTOMOTIVE TRUCKS.
APPLICATION FILED MAR. 20, 1920.
1,429,038.
Patented Sept. 12, 1922.
5 SHEETS—SHEET 1.
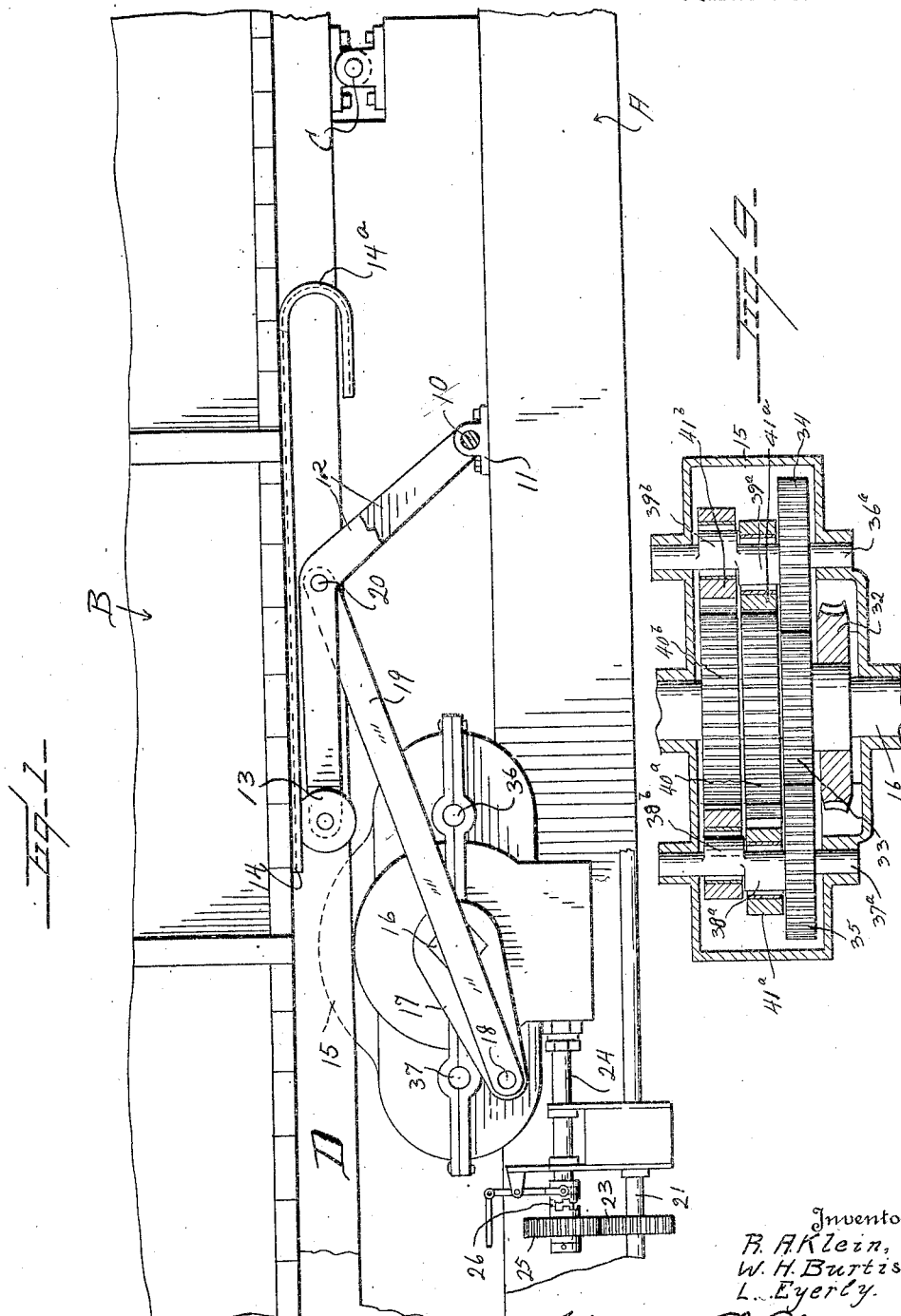
Inventors
R. A. Klein,
W. H. Burtis,
L. Eyerly.
By Watson E. Coleman
Attorney

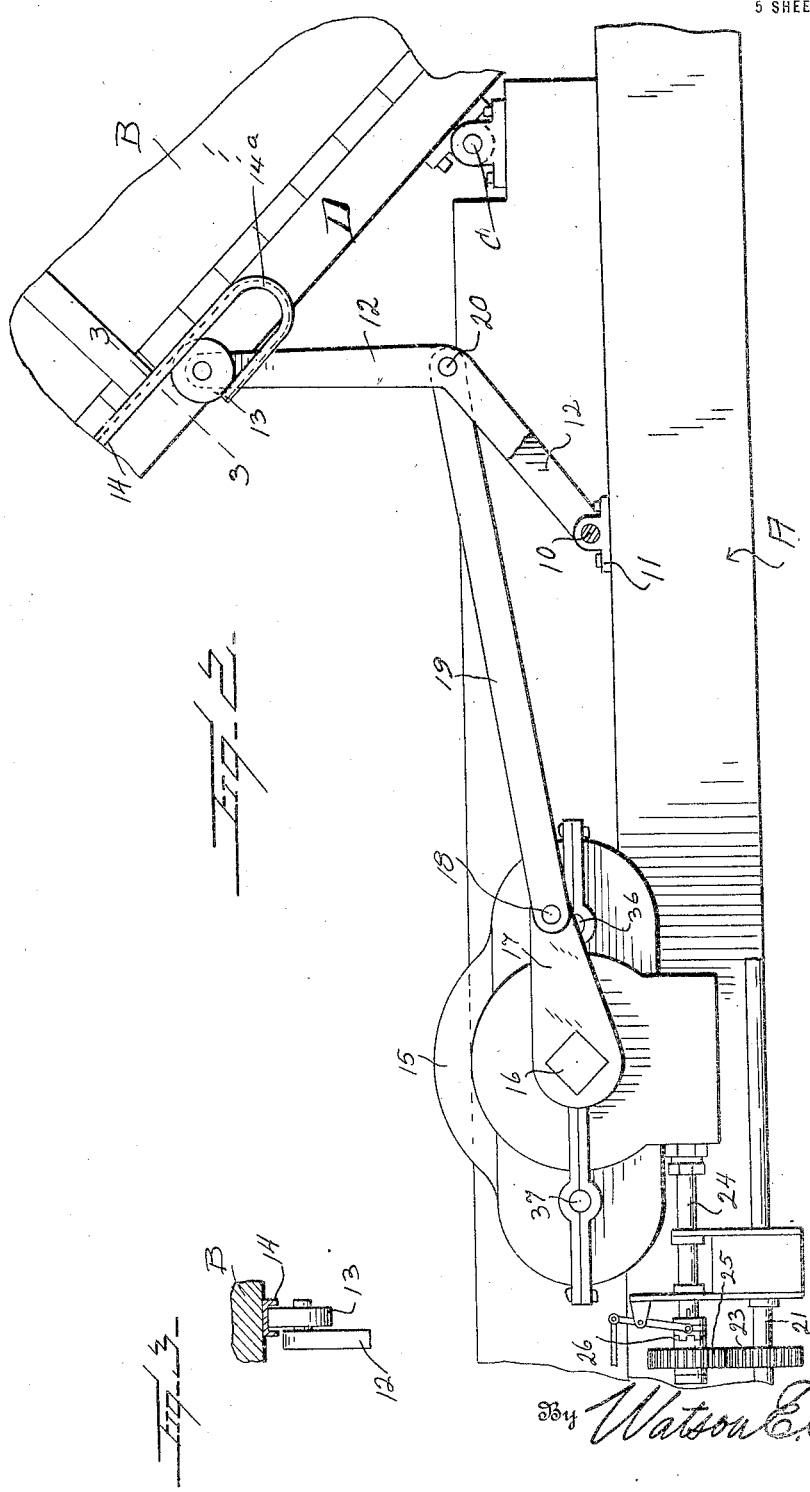

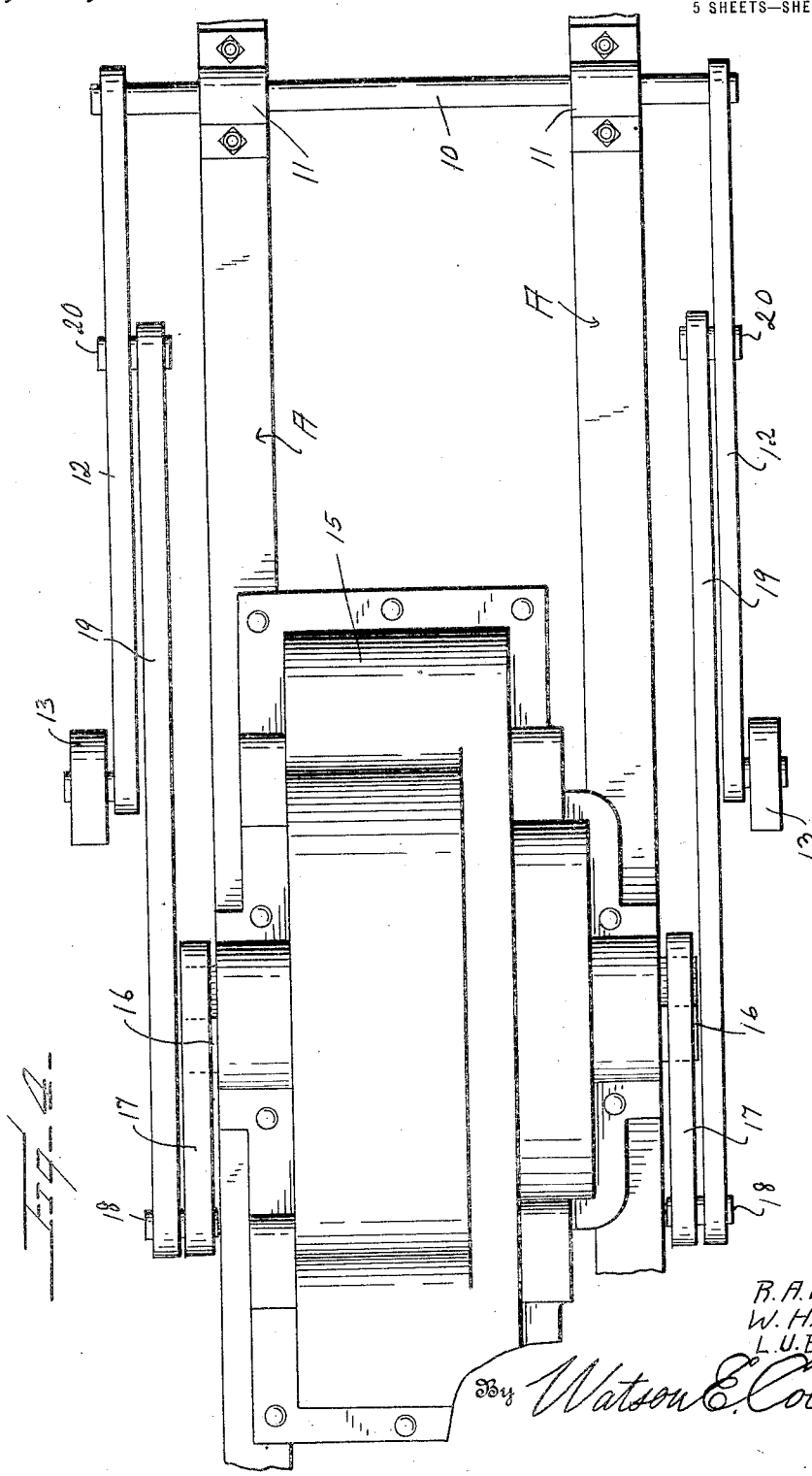

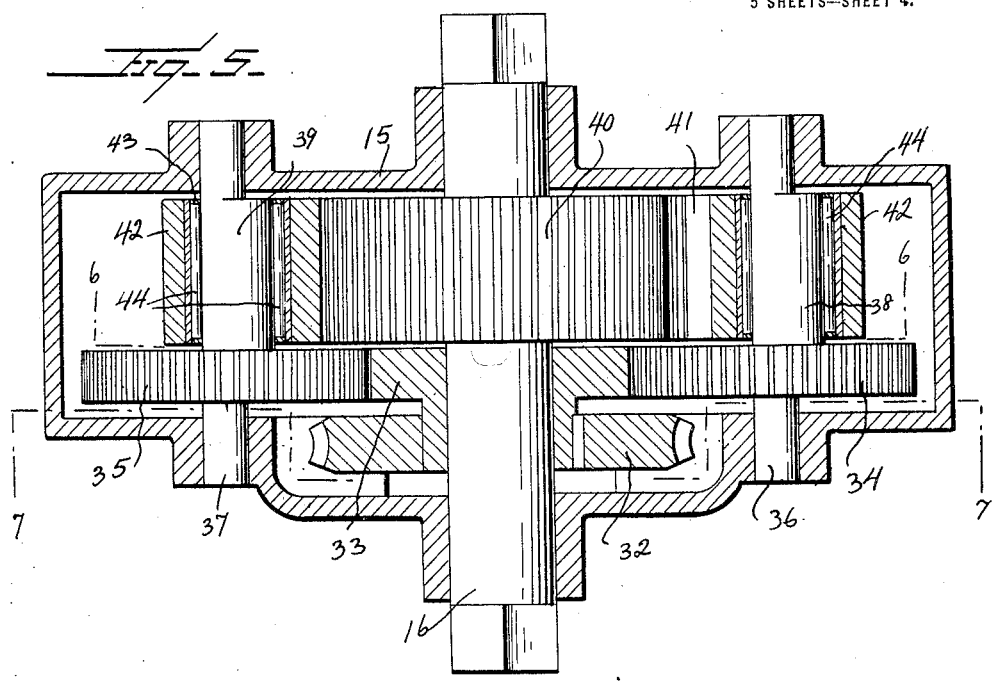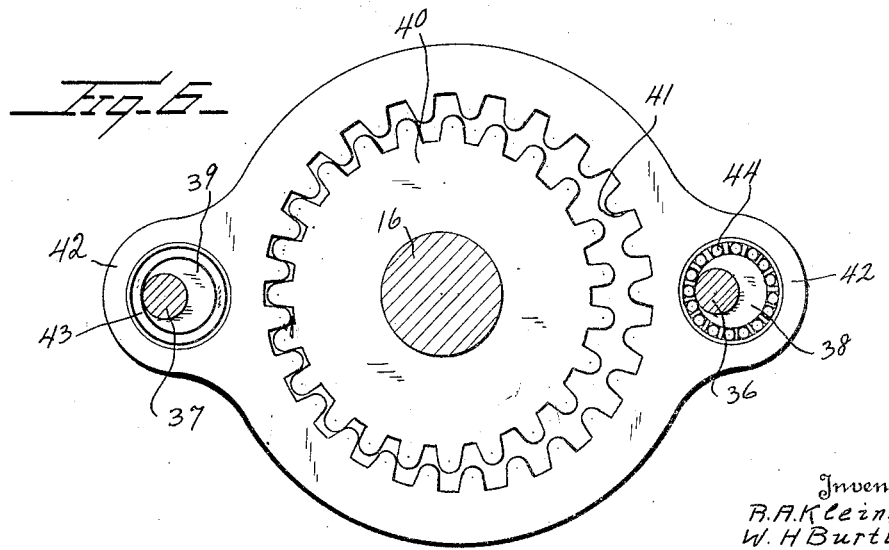

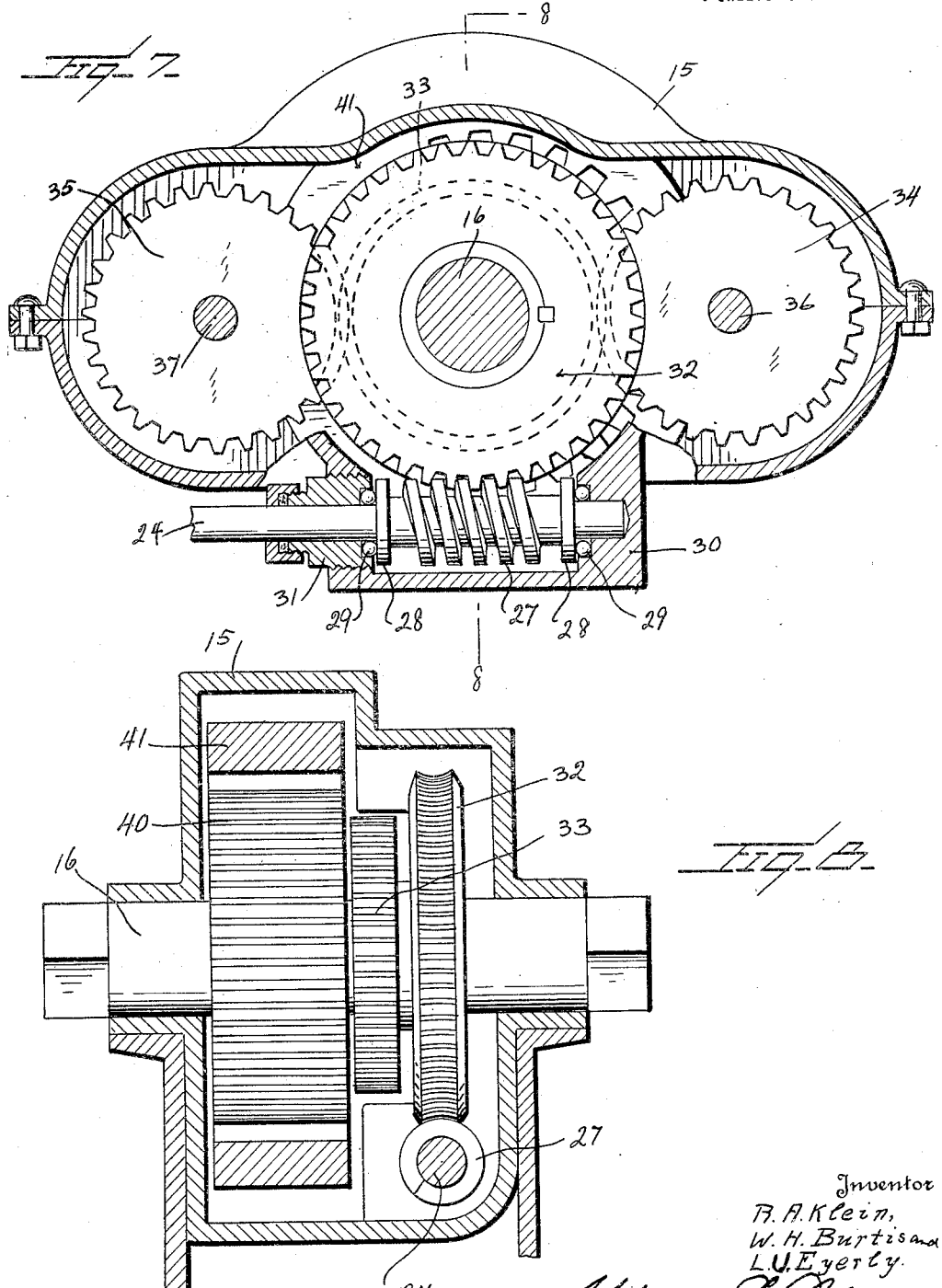

Patented Sept. 12, 1922.

1,429,038

UNITED STATES PATENT OFFICE.

ROY A. KLEIN, WARREN H. BURTIS, AND LEE U. EYERLY, OF SALEM, OREGON.

ELEVATING MECHANISM FOR AUTOMOTIVE TRUCKS.

Application filed March 20, 1920. Serial No. 367,392.

*To all whom it may concern:*

Be it known that we, ROY A. KLEIN, WARREN H. BURTIS, and LEE U. EYERLY, citizens of the United States, residing at Salem, in the county of Marion and State of Oregon, have invented certain new and useful Improvements in Elevating Mechanism for Automotive Trucks, of which the following is a specification, reference being had to the accompanying drawings.

This invention relates, generally speaking, to mechanical movements, and more particularly to power operated mechanism for the purpose of tipping or tilting dumping trucks and discharge the contents thereof.

The general object of this invention is to provide means for tilting the body of an automotive dumping truck by means of power transmitted from the engine of said truck.

A further object is to provide a mechanical movement for this purpose which is extremely powerful in its action so that it may be used on heavy tilting trucks.

Still another object is to provide a mechanism of the character described by means of a rotatable member or members movable under power in one direction so that upon a movement of said rotatable member or members in one direction to a predetermined distance, the body of the truck will be tilted, and a further rotation in the same direction will permit the body of the truck to return to its horizontal and normal position.

A further object is to provide a mechanism to this end which includes an oscillatable lifting member engaging the truck body on one side of its pivotal axis, and which is oscillated by means of a rotatable element driven from the engine of the vehicle, and in this connection to provide improved means whereby the power of the engine is multiplied through suitable gearing, though the speed at which the truck body is tilted is reduced relative to the speed of the engine to thereby secure a power operated mechanism which will lift very heavy loads.

A further object is to provide a construction of this character which is thoroughly effective in practice and is of such character that it will withstand the very heavy strains to which it is subjected, and in which the truck body may be held in its tilted position upon disconnecting the tilting mechanism from the engine of the vehicle.

Other objects will appear in the course of the following description.

Our invention is illustrated in the accompanying drawings, wherein:—

Figure 1 is a fragmentary side elevation of a portion of a dumping truck with our mechanism applied thereto;

Fig. 2 is a like view to Figure 1 but showing the body tipped to its dumping position;

Fig. 3 is a section on the line 3—3 of Figure 2;

Fig. 4 is a top plan view of the construction illustrated in Figure 1 with the body removed;

Fig. 5 is a horizontal section through the housing 15 showing the gears within the housing;

Fig. 6 is a section on the line 6—6 of Figure 5;

Fig. 7 is a section on the line 7—7 of Figure 5;

Figure 8 is a section on the line 8—8 of Figure 7;

Figure 9 is a horizontal sectional view of the same character as Figure 5, but showing a double internal gear and double gear wheels engaging therewith.

Referring to the drawings, and particularly to Figures 1 and 2, A designates the chassis of the truck, which may be constructed in any suitable manner and forms no part of our invention, and B designates the tilting body of the truck having sills D, which is mounted upon an axis formed by suitable trunnions or a shaft C. We do not wish to be limited to any particular form of truck or any particular way in which the body is mounted upon the chassis of the vehicle, as our invention has no relation to these parts.

Mounted upon the chassis is a transverse rock shaft 10, which is mounted in bearings 11 on the chassis and has attached to it and rotating with it the angular lifting arms 12. These arms extend upward and forward and then forward beneath the body of the truck when the latter is in a horizontal position, and the extremities of these arms are angularly bent and carry upon them the rollers 13. Preferably these rollers operate within channel irons 14 mounted upon the body of the truck so that the rollers cannot move laterally but will not be held from movement in a longitudinal line. These channel irons are hooked at their rear ends, as at 14ª, to hold the truck body from overturning.

Mounted upon the chassis in any suitable way is a gear housing 15, through which extends a shaft 16 having squared or many-sided ends or having other suitable means for transmitting rotary motion to the crank arms 17 mounted thereon. In the outer ends of the crank arms 17 are wrist pins 18, and extending from these wrist pins are the links 19 which, at their ends, pivotally engage with pins 20 or like elements projecting inward from the angular arms 12, in the manner illustrated in Figure 4.

The shaft 16 is intended to be rotated by power taken from the engine or motor of the vehicle. To this end, the driving shaft 21 of the engine, rearward of the usual universal joint (not shown), is provided with a gear wheel 23, and disposed parallel to the shaft 21 and extending rearward relative to the shaft is a parallel shaft 24 which carries upon its forward end a gear wheel 25 which meshes with the gear wheel 23, or is otherwise arranged to get its power from the gear wheel 23. Either the gear wheel 25 or the gear wheel 23 may be loose upon its shaft and may be clutched thereto or unclutched therefrom. We have illustrated the gear wheel 25 as being loose upon the shaft 24 and as being adapted to be engaged therewith by means of a clutch 26 of a common and ordinary form. The shaft 24 extends into the housing 15 and carries upon it the worm 27, which is keyed or otherwise attached to the shaft 24, this form operating between thrust collars 28 engaging with anti-friction balls 29, one set of which bears against the wall of the housing immediately surrounding the shaft bearing 30 and the other set of these balls bearing against a thrust block 31 having screw-threaded engagement with the housing and having a stuffing box through which the shaft 24 passes.

Mounted loosely upon the shaft 16 is a worm gear wheel 32 which is engaged by the worm 27, and mounted to rotate with this worm gear wheel or formed integral therewith and, of course, loose upon the shaft, is a spur gear 33. This spur gear 33 meshes with the two laterally disposed spur gears 34 and 35 mounted in the housing and secured to the shafts 36 and 37 respectively.

The shaft 36 is mounted in the walls of the housing 15 and to one side of the gear 34, and carries upon it an eccentric 38. The shaft 37 is mounted in the housing in the same manner as the shaft 36 and carries upon it an eccentric 39. Mounted upon and secured to the shaft 16 for rotation therewith is a gear wheel 40, which gear wheel is relatively broad and has the same width as the eccentrics 38 and 39. Surrounding this gear wheel 40 is a relatively large internal gear wheel 41 having laterally projecting yokes 42 which surround the eccentrics 38 and 39 respectively and constitute eccentric rings. Both of the eccentrics 38 and 39 are set in the same angular direction relative to the shafts 36 and 37, upon which they are mounted. The shafts 36 and 37 will, of course, be rotated in the same direction by the gear wheel 33, and as these eccentrics are set in the same angular direction, it follows that the internal gear wheel 41 will be given a movement in a circle. The internal teeth of the gear wheel 41 will thus successively engage with the teeth on the spur gear wheel 40 and a complete rotation of the eccentrics 38 and 39 will give one complete revolution of the axis of the internal gear wheel 41 about the axis of the spur gear 40 and will give a movement of two teeth to the gear wheel 40, in a manner which will be obvious from the drawings. Thus, a relatively slow rotation will be communicated to the shaft 16.

Preferably the parts 42 which constitute the eccentric rings carried by the internal gear 41 will carry a cage 43 provided with anti-friction rollers 44, as shown in Figure 6, thus reducing the friction between the eccentrics and the eccentric rings as much as possible. Any other anti-friction device might be used, however. Inasmuch as the gear wheel 40 is mounted upon the shaft 16, and inasmuch as this shaft carries the crank arms 17, it follows that the slow rotation of the shaft 16 will cause the gradual elevation of the lifting arms 12 until these arms have reached the extreme of their upward movement, and then a further rotation of this shaft 16 in the same direction will cause a downward movement of these arms to their initial position.

The operation of this mechanism will be obvious from what has gone before, but it may be pointed out that when the body has been tilted either to its full extent or partially tilted, the body may be held in this tilted position from further movement by shifting the clutch 26 to thereby disconnect the driven gear 25 from the driving gear 23. Under these circumstances, the worm 27 will hold the gears from any reverse movement, even if such a reverse movement were possible between the gear wheel 42 and the internal gear 41. It is further to be noted that the body is tilted and then brought back to its normal position by a continuous movement of the shaft 16, and thus if by any chance the operator should forget to release the clutch 26, the sole result would be that the body would be tilted and then gradually lowered again and then once more tilted and lowered, and so on until the clutch was released. It will likewise be obvious that by the mechanism employed, the power of the engine is very greatly multiplied so that an extremely powerful lifting action is secured, though, of course, at a relatively slow speed. This permits the engine of the truck to be used for the purpose of tilting the body, and this is particularly necessary in very heavy trucks, such, for instance, as are used in carrying road material and the like. Without lifting mechanism of this character, the strain on the engine would be very great and reversing mechanism would have to be used for reversing the movement of the engine, unless the clutch was thrown off at exactly the proper time. The gearing is, of course, entirely enclosed within the housing 15 so that this gearing may run in oil and be entirely protected from dirt, dust and other foreign matter which would tend to injure the gears.

It will be seen that the speed at which the gear wheel 40 turns is determined by the difference in the number of teeth between the gear wheel 40 and the internal gear wheel 41. Thus, if the internal gear wheel 41 has 30 teeth and the gear wheel 40 has 28 teeth, the shafts 36 and 37 will make 14 revolutions to secure one complete revolution of the gear wheel 40.

While we have heretofore described the use of a single internally toothed yoke or internal gear wheel 41, yet we do not wish to limit our invention to any specific number of internal gears or eccentrics, for two or more internal gears or any number of eccentrics may be used as desired. Preferably two internal gear wheels will be used, each internal gear wheel operating in connection with two gear wheels each of which is like the gear wheel 40. Such a construction is illustrated in Figure 9, wherein the shaft 16 passes through the housing 15 as heretofore described and carries loosely mounted on it the worm wheel 32 and gear wheel 33, this gear wheel meshing with the two laterally disposed gear wheels 34 and 35. All of these parts are of the same character as those illustrated in Figure 5. The gear wheels 34 and 35 are mounted upon the shafts 36$^a$ and 37$^a$ corresponding to the shafts 36 and 37 in Figure 5, but these shafts 36$^a$ and 37$^a$ are formed with two eccentrics 38$^a$ and 38$^b$ and 39$^a$ and 39$^b$. Carried by the shaft 16 are the two gear wheels 40$^a$ and 40$^b$, and operating in connection with these two gear wheels are two internally toothed gear wheels or yokes 41$^a$ and 41$^b$, each having a lateral prolongation, as illustrated in Figure 6, and each coacting with a pair of the eccentrics, the internal gear wheel 41$^a$ coacting with the eccentrics 38$^a$ and 39$^a$ and the internal gear wheel 41$^b$ coacting with the eccentrics 38$^b$ and 39$^b$. Otherwise than this, the mechanism is precisely the same as that illustrated in Figures 1 to 8 and both of the gear wheels 40$^a$ and 40$^b$, and both of the internally toothed yokes or gear wheels 41$^a$ and 41$^b$ is constructed in accordance with the construction illustrated in Figure 6 for the gear wheel 40 and the internal gear wheel 41. The purpose of using two internally toothed gears instead of one and using two pairs of eccentrics instead of one pair is that in the mechanism shown in Figure 9 one set of eccentrics works opposite to the other and so the mechanism is more perfectly balanced and an easier and steadier motion is secured.

While we have illustrated this mechanical movement as applied to the tilting of truck bodies, yet it will be understood that we do not wish to be limited to its use for this purpose, as it might be used in a variety of different circumstances for the purpose of elevating a body or tilting it. It will be seen that the arms 12 constitute elevating members with which the actuating mechanism is operatively connected as described, the actuating mechanism being driven from a power driven shaft as indicated. The mechanism is particularly adapted, as will be seen, to the tilting of truck bodies where the truck is driven under its own power, that is is automotive, but is not necessarily restricted to such use, nor is it intended to be limited to a power driven device for it is obvious that this might readily be operated by hand, as in the case of small trucks or other comparatively light weights.

We claim:

1. An automotive truck including a supporting frame, a body pivoted to the supporting frame for tilting movement, means for tilting the body comprising a pair of arms operatively pivoted to the frame beneath the body, their free ends having sliding engagement with the under side of the body, a crank shaft mounted on the frame and having cranks, and links connecting said cranks to the pivoted arms.

2. An automotive truck including a supporting frame, a motor operated shaft thereon, a body pivoted to the supporting frame for tilting movement, means for tilting the body comprising a pair of arms operatively pivoted at their lower ends to the frame beneath the body and having their free ends bearing against the under side of the body, a crank shaft having cranks thereon, links operatively connecting the cranks to the arms, and power operated means on the frame for rotating said shaft including means for connecting the shaft to or disconnecting it from the motor operated shaft.

3. An automotive truck including a supporting frame, a body pivoted adjacent its rear end to said frame adjacent its rear end for tilting movement, and means for tilting the body comprising a pair of arms operatively pivoted to the frame forward of the pivotal axis of the body and their free ends having sliding engagement with the body forward of the pivotal axis thereof, a crank shaft on the frame having cranks, and links connecting said cranks to the arms.

4. An automotive truck including a supporting frame, a body pivoted for tilting movement at its rear end to the supporting frame adjacent the rear end of the frame, and means for tilting the body comprising a pair of angular arms pivoted to the frame beneath the body and forward of the pivotal axis of the body, the free ends of the arms bearing against the under side of the body and having sliding engagement therewith, a shaft having cranks, and links connecting said cranks to the pivoted arms, the upper ends of the angular arms being disposed in an approximately horizontal plane when the body is resting entirely upon the frame and being disposed in a vertical plane when the body is fully raised.

5. An automotive truck including a supporting frame, a motor operated shaft thereon, a tilting body pivoted to the supporting frame for tilting movement, means for tilting the body comprising a pair of arms pivoted at their lower ends to the supporting frame, the free ends of the arms having sliding engagement with the body, the pivotal axis of said arms being forward of the pivotal axis of the body, a shaft extending parallel to the pivotal axes of the arms and forward thereof, said shaft having crank arms, links connecting the crank arms to each arm, and power operated means for rotating said shaft including means for connecting the shaft to or disconnecting it from the motor operated shaft.

6. An automotive truck including a supporting frame, a motor operated shaft thereon, a tilting body pivoted to the supporting frame and having longitudinally extending tracks disposed forward of the tilting axis, a pair of arms pivoted at their lower ends upon the supporting frame forward of the pivotal axis of the body, the free ends of said arms having sliding engagement with said tracks, a transverse shaft mounted on the frame forward of the axes of said arms and having crank arms, links connecting said crank arms to the pivoted arms, and power operated means for rotating said shaft including means for connecting the shaft to or disconnecting it from the motor operated shaft.

7. An automotive truck including a supporting frame, a body pivoted at its rear end to the rear end of the supporting frame, the body being provided with longitudinally extending track irons, the rear ends of said irons being downwardly and forwardly extended parallel to the body of the irons, means for tilting the body comprising a pair of arms operatively pivoted at their lower ends to the frame forward of the pivotal axis of the body, the free ends of the arms having rollers engaging against said tracks, a crank shaft on the frame forward of the pivotal axes of said arms and links connecting the cranks of said shaft to said arms engaging each arm at the vertex of its angle, and power operated means for rotating said shaft including means connecting the shaft to or disconnecting it from the motor operated shaft.

8. A dumping truck including in combination a tiltable body, a supporting frame upon which the body is mounted, a transverse shaft mounted on the supporting frame, a gear wheel fast on said shaft and disposed between the ends of the shaft, an internal gear wheel surrounding the first named gear wheel, the internal gear wheel being formed with oppositely disposed rings, eccentrics disposed in said rings and having the same angular direction, shafts for said eccentrics, spur gear wheels mounted upon said shafts and disposed on opposite sides of the first named shaft, a sleeve surrounding said first named shaft, an intermediate spur gear wheel mounted upon said sleeve and meshing with both of said first named spur gear wheels, and power operated means disposed in a plane between the ends of the first named shaft and operatively engaging said sleeve to rotate said intermediate spur gear wheel, and means on the extremities of the first named shaft for operatively engaging the body and tilting it when the power operated means is operated.

In testimony whereof we hereunto affix our signatures.

ROY A. KLEIN.
WARREN H. BURTIS.
LEE U. EYERLY.